3,143,431
PROCESS FOR THE MANUFACTURE OF VALUABLE BRIGHT DRYING POLISH WAXES
Josef Kaupp, Albert Thalhofer, Heinrich Träger, and Wolfgang Sapper, all of Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed July 25, 1960, Ser. No. 44,835
Claims priority, application Germany July 31, 1959
9 Claims. (Cl. 106—8)

The present invention relates to a process for the manufacture of valuable bright drying polish waxes.

Up to the present time, few waxes have come to be known that can be used for the manufacture of bright drying polish emulsions. Of the natural waxes, carnauba wax is most suitable since it can be emulsified very satisfactorily both with ionic and non-ionic emulsifiers, and emulsions thereof yield comparatively good bright drying polish films. Of the waxes that are partly synthetic, wax esters obtained, for example, by bleaching crude montan wax with chromic acid and subsequent esterification of the wax acids obtained with diols of low molecular weight, have proved to be very useful in the production of non-ionic bright drying polish emulsions.

It has also been proposed to use as bright drying polish waxes oxidation products of hard paraffins, especially those of the Fischer-Tropsch synthesis. However, these products have the disadvantage that, in comparison with the carnauba wax, they generally yield softer bright drying polish films which, therefore, have a reduced mechanical resistance.

It is furthermore, known to prepare bright drying polish waxes from hard paraffins by chlorination, dehydrochlorination, subsequent oxo synthesis and alkali melt. This rather troublesome preparation of the waxes prevents their being used in many fields of application.

Now we have found a process for the manufacture of valuable bright drying polish waxes having manyfold good properties. The process consists in esterifying carboxylic acids of high molecular weight, with the addition of dicarboxylic acids and/or the anhydrides or mixtures thereof, in certain proportions with dihydric alcohols or mixtures of dihydric alcohols, while part of the dihydric alcohols in order to attain special effects, such as hardness or easier emulsifiability of the wax, resistance to cold of the emulsions etc., may also be replaced by trihydric alcohols or alcohols of an even higher valency and/or by oxalkylation products, especially oxethylation products of polyhydric phenols and/or phenol aldehyde resins, especially phenol formaldehyde resins, and/or terpene phenol resins containing more than one hydroxyl group in the molecule.

As carboxylic acids of high molecular weight, there are used fatty acids and wax acids having more than 18 carbon atoms, preferably more than 24 carbon atoms, and especially the acids obtained by chromic acid bleaching of crude montan wax or mixtures of crude montan wax with the oxidation products of paraffins and/or polyolefins. There may be used primarily oxidation products of synthetic paraffins, such as Fischer-Tropsch paraffins, and micro-crystalline petroleum paraffins having a melting point of at least 70° C., preferably above 90° C., or oxidation products of polyolefins, for example polyethylenes and polypropylenes obtained by the high-pressure and low-pressure process, as well as degradation products of low molecular weight that can be prepared from the aforesaid polyethylenes and polypropylenes.

The mixtures of fatty acids and/or wax acids with oxidized paraffins and/or oxidized polyolefins are prepared preferably either by melting together the fatty acids or wax acids with oxidized paraffins and/or oxidized polyolefins or by melting together the crude montan wax with air oxidation products of polyolefins or paraffins and by subsequently oxidizing these products jointly with chromic acid, the method to be applied in each individual case depending on the kind of the desired final product.

The ratio of wax acids to the oxidized paraffin and/or polyolefin may vary within wide limits. The most favorable ratio was found to be in the range from 0.2:1 to 5:1, preferably from 0.3:1 to 2:1.

In order to attain an even greater hardness, or a higher flow point/drop point, it may be advantageous to treat the bleached montan wax or a mixture of fatty acids and/or or wax acids with oxidation products of paraffins or polyolefins prior to the esterification in known manner with organic solvents, such as acetone, methyl ethyl ketone, methanol, ethanol, methylene chloride and thereby to remove the portions of low molecular weight by extraction.

The equivalent proportion of dicarboxylic acids and/or the anhydrides thereof to fatty acids and/or wax acids of high molecular weight is generally within the range of 2:1 and 1:2, preferably 0.8:1 and 1.25:1.

There are mentioned as suitable difunctional acids especially succinic, adipic, pimelic, azelaic, sebacic, maleic, fumaric and itaconic acid, the isomeric phthalic acids, phthalic acids chlorinated in the nucleus, alkyl, for example methyl-substituted phthalic acids or the hydrogenation products thereof.

The equivalent proportion of the acid components used to the alcohols applied may vary within certain limits in the course of the esterification without substantially impairing the bright drying polish properties. Thus there may be used, for example, 2 to 0.5 equivalent, preferably 1.25 to 0.8 equivalent of difunctional alcohols per 1 equivalent of the acids applied. As alcohols, there are especially used diols, such as ethylene glycol, diethylene glycol, propylene glycol, butylene glycol, hexylene glycol, pentanediol, nonanediol and decanediol, dimethylol benzene, dimethylol toluene or dimethylol xylene, terephthalic acid-bis-decanediol ester, especially also mixtures thereof. With the use of ionic emulsifiers in the preparation of the emulsion there are, in general, obtained, under otherwise analogous test conditions, higher bright drying polish values with the rising equivalent weight of the dihydric alcohol or alcohol mixture used for the preparation of the wax.

In order to attain special effects it may, under certain circumstances, be necessary to replace part of the quantity of dihydric alcohols applied in the process of the invention by polyhydric alcohols, such as trimethylol propane, trimethylol ethane, pentaerythritol, hexanetriol, or by oxalkylation or oxethylation products, for example those containing an average up to 1.5 moles of ethylene oxide per hydroxyl group, of polyhydric phenols, for example 4,4'-dihydroxy-diphenyl propane, resorcinol, butyl phenol formaldehyde resins, terpene phenol resins, etc. These polyfunctional alcohols are advantageously applied according to the invention in an amount not exceeding 50 equivalent percent, preferably 5 to 50 equivalent percent, calculated on the total amount of the alcohol applied.

The esterification takes place in known manner with the use of known esterification catalysts, such as sulfuric acid, phosphoric acid, aryl sulfonic acid or triphenyl phosphite and preferably in the presence of an inert gas, such as carbon dioxide or nitrogen, by heating at an elevated temperature, for example at 80° to 200° C. The presence of an inert solvent may be advantageous.

The waxes that may be obtained according to the present invention can be emulsified very satisfactorily both with ionic and non-ionic emulsifiers and yield emulsions which, after application and drying, leave a bright drying polish.

In order to produce the maximum bright drying polish, it is of great importance to maintain a certain acid number range in the finished esterification product. The maximum bright drying polish is produced, in the case of ionic emulsifiers, in an acid number range of the finished wax of 5 to 50, mostly 10 to 40, preferably 10 to 35. When using non-ionic emulsifiers, for example those on the basis of polyethylene oxides, this acid number range is shifted to the range of slightly higher acid numbers.

The wax films obtained with the valuable bright drying polish waxes prepared according to the present invention are distinguished by a good slip resistance which may possibly still be increased in known manner by the incorporation of resins, for example resins based on terpene phenols. Moreover, the wax films have a good waterproofness at least equalling or even surpassing the waterproofness of films obtained from bright drying polish emulsions of natural waxes, such as carnauba wax, and the emulsions are distinguished by good cold- and heat-resistance.

The following examples serve to illustrate the invention, but they are not intended to limit it thereto, the parts being by weight:

*Example 1*

206 parts (0.5 equivalent) of a wax acid obtained by bleaching crude montan wax with chromic acid, and 37 parts (0.5 equivalent) of phthalic anhydride were heated with 59 parts (1.0 equivalent) of hexanediol-1,6, with the addition of 0.4 part of sulfuric acid of 20 percent strength, in an agitator vessel at 120° to 150° C. until the acid number receded to 10 to 14.

A light-yellow, hard wax was obtained having the following characteristic numbers:

Saponification number _____ 212.
Flow point/drop point (according
  to Ubbelhode) _____ 79°/80° C.
Flow hardness _____ 400 to 420 kg./cm.²

This wax could very well be emulsified with the aid of ionic emulsifiers according to the following recipe:

12 parts of a wax prepared according to Example 1 were melted in known manner with the addition of 1.5 parts of oleic acid and 2.0 parts of morpholine and emulsified by the addition of 84.5 parts of water. When the emulsion had dried up, a brilliant, hard wax film remained behind which required no polishing.

The flow hardness was measured in the following manner: A test body cast into a small steel pot was exposed, at 20° C., to the pressure of a punch which was gradually increased by means of a pneumatically operating device. According to this method, there is to be understood by "hardness of the wax" the pressure, expressed in kg./cm.², at which the punch breaks into the test body.

*Example 2*

206 parts (0.5 equivalent) of a montan wax acid obtained by bleaching crude montan wax with chromic acid, 15 parts (0.2 equivalent) of phthalic anhydride, 14.8 parts (0.3 equivalent) of maleic anhydride and 59 parts (1.0 equivalent) of hexanediol-1,6, were esterified as described in Example 1 with the addition of 0.4 part of sulfuric acid of 20 percent. A light-yellow, hard wax was obtained having the following characteristic values:

Acid number _____ 14
Saponification number _____ 222
Flow point/drop point _____ 80°/81° C.

The wax could be readily emulsified with ionic emulsifiers; with this emulsion bright drying polish films were obtained.

*Example 3*

206 parts (0.5 equivalent) of a wax acid obtained by bleaching crude montan wax, 15 parts (0.2 equivalent) of phthalic anhydride, 30 parts (0.3 equivalent) of sebacic acid and 93 parts (1.07 equivalents) of decanediol-1,10 were esterified as described in Example 1 in the presence of 0.5 part of sulfuric acid of 20 percent strength, and a light-yellow wax was obtained that could readily be emulsified. The emulsions of said wax, after drying, left behind a gloss surpassing that of the carnauba wax emulsions. The characteristic numbers were:

Acid number _____ 11
Saponification number _____ 194
Flow point/drop point _____ 81°/82° C.

*Example 4*

206 parts (0.5 equivalent) of a wax acid obtained by bleaching crude montan wax with chromic acid, 37 parts (0.5 equivalent) of phthalic anhydride and 93 parts (1.07 equivalents) of decanediol-1,10 were esterified in the presence of 0.5 part of sulfuric acid of 20 percent strength under a blanket of nitrogen, with agitation and at a temperature of 130° to 160° C., until the mixture had an acid number of 15. Then 20 parts (0.01 equivalent) of an air-oxidized degradation product of polyethylene were added and esterification was continued until an acid number of 12 was obtained. A light-colored wax was obtained having a flow point/drop point of 106°/107° C. and a saponification number of 182, possessing great hardness and being readily emulsifiable with ionic emulsifiers.

*Example 5*

217 parts (0.5 equivalent) of a wax acid which was and which was freed from soft portions of low molecular obtained by oxidizing crude montan wax with chromic acid weight by treatment with methanol, 22 parts (0.3 equivalent) of phthalic anhydride, 9.8 parts (0.2 equivalent) of maleic anhydride and 60 parts (1.0 equivalent) of hexanediol-1,6 were esterified, as described in Example 1, with the addition of 0.4 part of sulfuric acid of 20 percent strength until an acid number of 14 was obtained. A very light-colored wax was obtained which could very well be used for the production of bright drying polish emulsions.

*Example 6*

220 parts (0.5 equivalent) of a wax acid which was obtained by bleaching crude montan wax with chromic acid and freed from portions having a low molecular weight by treatment with acetone, 15.5 parts (0.2 equivalent) of phthalic anhydride, 63 parts (0.264 equivalent) of decanediol-1,10 were esterified in the presence of 0.6 part of sulfuric acid of 20 percent strength under a blanket of nitrogen, with rapid agitation at 130° to 150° C., until an acid number of 12 was obtained. A yellow wax was obtained that could very readily be emulsified with ionic emulsifiers.

When this wax was worked up according to the following recipe:

12 parts of a test wax
1.5 parts of oleic acid
2.0 parts of morpholine
84.5 parts of water an emulsion was obtained yielding, after drying, bright drying polish films possessing gloss values up to 91.

The gloss was measured by means of a glossmeter according to Dr. Lange with the use of a shiny film, the gloss value of which was fixed at 100 percent.

*Example 7*

298 parts (0.5 equivalent) of a wax acid obtained by oxidizing crude montan wax with chromic acid, 18.5 parts (0.25 equivalent) of phthalic anhydride and 11.2 parts (0.23 equivalent) of maleic anhydride were esterified according to the process described in Example 1 with a mixture of 17.9 parts (0.4 equivalent) of terephthalic acid-bis-decanediol ester and 35 parts (0.4 equivalent) of hexanetriol and 41.4 parts (0.7 equivalent) of hexanediol in the presence of 0.6 part of sulfuric acid of 20 percent strength. A light-brown, very hard wax was obtained that could be worked up with ionic emulsifiers to yield very good bright drying polish emulsions. The characteristic numbers were:

Acid number _____ 19.
Saponification number _____ 171.
Flow point/drop point _____ 80°/83° C.
Flow hardness _____ 590 to 620 kg./cm.$^2$.

*Example 8*

186 parts (0.5 equivalent) of a wax acid obtained by bleaching crude montan wax with chromic acid were heated at 130° C. with agitation and passing through nitrogen with 15 parts (0.2 equivalent) of phthalic anhydride, 16.2 parts (0.33 equivalent) of maleic anhydride, 48 parts (0.8 equivalent) of hexanediol and 31.6 parts (0.2 equivalent) of bis-β-hydroxy-ethyl ether of 4.4′-dihydroxy-diphenylpropane with the addition of 0.5 cc. of sulfuric acid of 20 percent strength, until the acid number receded to 10.

A yellow, hard wax was obtained that could be well emulsified with ionic emulsifiers and the emulsions of which left behind a bright drying polish. The characteristic numbers were:

Acid number _____ 10.
Saponification number _____ 212.
Flow point/drop point _____ 76°/77° C.
Flow hardness _____ 465 to 520 kg./cm.$^2$.

*Example 9*

A mixture of 226 parts (0.5 equivalent) of a wax acid obtained by bleaching crude montan wax with chromic acid, 18.5 parts (0.25 equivalent) of phthalic anhydride and 12.2 parts (0.25 equivalent) of maleic anhydride were esterified as described in Example 1 with 36 parts (0.8 equivalent) of butanediol-1,4 and 36.2 parts (0.175 equivalent) of a mono-oxethylated para-sec. butylphenol formaldehyde. A brown wax was obtained the hardness of which surpassed the hardness of the carnauba wax and the ionic emulsions of which were superior to carnauba emulsions as regards their bright drying polish. The characteristic numbers were:

Acid number _____ 19.
Saponification number _____ 183.
Flow point/drop point _____ 79°/80° C.
Flow hardness _____ 710 to 740 kg./cm.$^2$.

We claim:

1. A process for the manufacture of a bright drying polish wax, which comprises heating to an elevated temperature at least one aliphatic carboxylic acid containing more than 18 carbon atoms and a member selected from the group consisting of dicarboxylic acids, phthalic anhydride and mixtures of phthalic anhydride and maleic anhydride with a mixture of dihydric alcohols in which the hydroxyl group is attached to an aliphatic carbon atom and which contains, besides the hydroxyl groups, only carbon and hydrogen atoms, with the presence of up to 50 equivalent percent of an oxalkylated dihydric phenol resin until the acid number is in the range from 5 to 50, 0.5 to 2 equivalents of alcoholic hydroxyl groups being applied for one equivalent of carboxylic acid groups, and 0.5 to 2 equivalents of monocarboxylic acids for each dicarboxylic acid equivalent.

2. The process of claim 1, wherein a mixture of hexanediol and hexanetriol is used as the alcohol component.

3. The process of claim 1, wherein a chromic acid oxidation product of montan wax is used as the aliphatic carboxylic acid starting material.

4. The process of claim 1, wherein as the aliphatic carboxylic acid starting material a chromic acid oxidation product of a mixture of (*a*) one part of montan wax and (*b*) 0.2 to 5 parts of an oxidation product of a hydrocarbon selected from the group consisting of paraffins, olefin polymers and mixtures thereof is used.

5. The process of claim 1, wherein the dicarboxylic acid component is a mixture of phthalic anhydride and maleic anhydride.

6. A process for the manufacture of a bright drying polish wax, which comprises heating to a temperature in the range between 120° and 150° C. a chromic acid oxidation product of montan wax, phthalic anhydride, and maleic anhydride, with a mixture of 95 to 50 equivalent percent of butandiol-1,4 and 5 to 50 equivalent percent of a mono-oxethylated para-sec. butylphenol formaldehyde resin until the acid number is in the range from 10 to 35, 0.8 to 1.25 equivalents of alcoholic hydroxyl groups being applied for one equivalent of carboxylic acid groups, and 0.8 to 1.25 equivalents of the chromic acid oxidation product of montan wax for each carboxylic acid equivalent of the phthalic anhydride/maleic anhydride mixture.

7. A bright drying polish wax consisting of an esterification product of at least one aliphatic carboxylic acid containing more than 18 carbon atoms and a member selected from the group consisting of dicarboxylic acids, phthalic anhydride and mixtures of phthalic anhydride and maleic anhydride, with a mixture of dihydric alcohols, in which the hydroxyl group is attached to an aliphatic carbon atom and which contain, besides the hydroxyl groups, only carbon and hydrogen atoms with the presence of up to 50 equivalent percent of an oxalkylated dihydric phenol resin, said esterification product having an acid number in the range from 5 to 50 and containing the alcoholic component in a ratio of 0.5 to 2 equivalent for each equivalent of carboxylic acid, and in which the carboxylic acid component contains from 0.5 to 2 equivalents of monocarboxylic acid for each dicarboxylic acid equivalent.

8. An aqueous emulsion of the wax of claim 7.

9. The emulsion of claim 8 containing an ionic emulsifier.

References Cited in the file of this patent

UNITED STATES PATENTS 2,427,255     Burrell et al. _____ Sept. 9, 1947
2,846,330     Berthold et al. _____ Aug. 5, 1958